United States Patent
Kemppainen et al.

(10) Patent No.: US 12,520,252 B2
(45) Date of Patent: Jan. 6, 2026

(54) AD HOC RADIO BASE STATION, METHOD AND COMPUTER PROGRAM

(71) Applicant: EXFO Oy, Oulu (FI)

(72) Inventors: Jukka Kemppainen, Oulu (FI); Juha Kumpula, Oulu (FI); Juha Lehtikangas, Oulu (FI)

(73) Assignee: EXFO OY, Oulu (FI)

( * ) Notice: Subject to any disclaimer, the term of this patent is extended or adjusted under 35 U.S.C. 154(b) by 622 days.

(21) Appl. No.: 17/959,617

(22) Filed: Oct. 4, 2022

(65) Prior Publication Data

US 2023/0105088 A1  Apr. 6, 2023

Related U.S. Application Data

(60) Provisional application No. 63/342,776, filed on May 17, 2022, provisional application No. 63/251,857, filed on Oct. 4, 2021.

(51) Int. Cl.
*H04W 24/10* (2009.01)
*H04W 56/00* (2009.01)

(52) U.S. Cl.
CPC ......... *H04W 56/001* (2013.01); *H04W 24/10* (2013.01); *H04W 56/0035* (2013.01)

(58) Field of Classification Search
CPC ........... H04W 72/0453; H04W 56/001; H04W 56/00; H04W 24/02; H04L 5/0023; H04L 5/06; H04L 27/2655
See application file for complete search history.

(56) References Cited

U.S. PATENT DOCUMENTS

| | | | |
|---|---|---|---|
| 10,863,461 | B2 | 12/2020 | Ko et al. |
| 2015/0289142 | A1 | 10/2015 | Abeysekera et al. |
| 2019/0053174 | A1 | 2/2019 | Nangia et al. |
| 2019/0069256 | A1 | 2/2019 | Jung et al. |

(Continued)

FOREIGN PATENT DOCUMENTS

| | | |
|---|---|---|
| CN | 103248440 A | 8/2013 |
| CN | 109474939 A | 3/2019 |

(Continued)

OTHER PUBLICATIONS

Biljana Bojovic et al: "Machine learning-based dynamic frequency and bandwidth allocation in self-organized LTE dense small cell deployments", EURASIP Journal on Wireless Communications and Networking, Biomed Central Ltd, London, UK, vol. 2016, No. 1, Aug. 8, 2016 (Aug. 8, 2016), pp. 1-16, XP021268260, DOI: 10.1186/S13638-016-0679-0 * p. 2, 2nd column, lines 25-41 p. 6, 1st column, lines 1-6 *.

(Continued)

*Primary Examiner* — Yee F Lam
(74) *Attorney, Agent, or Firm* — Baratta Law PLLC; Lawrence A. Baratta, Jr.

(57) ABSTRACT

An ad hoc radio base station obtains information regarding existing 5G NR SA cells; for each existing cell, performs an analysis by detecting a frequency of a synchronization signal block, of the existing cell from the information, decoding a radio frequency, bandwidth of the existing cell from the information, and measuring a reference signal received power of the existing 5G NR SA cell. The station also sets up an ad hoc 5G NR SA cell based on the analysis.

14 Claims, 8 Drawing Sheets

(56) References Cited

U.S. PATENT DOCUMENTS

Figure 1:
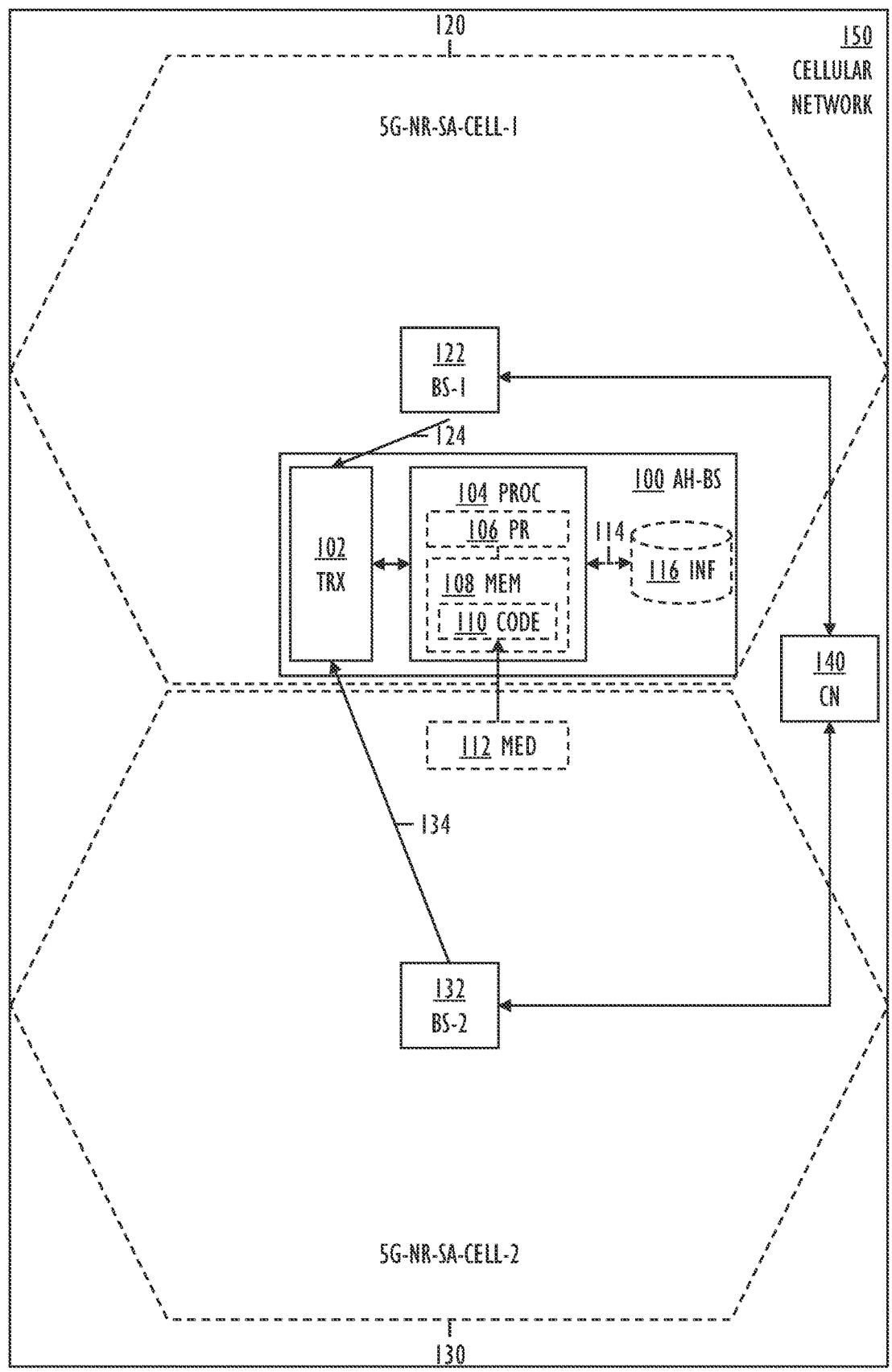

| | | | |
|---|---|---|---|
| 2019/0200307 A1* | 6/2019 | Si | H04W 72/0453 |
| 2019/0215749 A1* | 7/2019 | Shih | H04W 36/0069 |
| 2020/0053655 A1* | 2/2020 | Ghosh | H04W 88/10 |
| 2020/0229271 A1* | 7/2020 | You | H04W 72/23 |
| 2020/0280945 A1 | 9/2020 | Tiirola et al. | |
| 2020/0313838 A1* | 10/2020 | Jin | H04W 48/12 |
| 2020/0314861 A1* | 10/2020 | Goel | H04W 72/563 |
| 2021/0176670 A1* | 6/2021 | Keskitalo | H04L 5/0048 |
| 2021/0212007 A1* | 7/2021 | Liu | H04W 56/0015 |
| 2021/0306892 A1 | 9/2021 | Li et al. | |
| 2022/0022255 A1* | 1/2022 | He | H04W 72/12 |
| 2022/0061010 A1* | 2/2022 | Harada | H04W 48/16 |
| 2022/0116821 A1* | 4/2022 | Wei | H04B 7/15542 |
| 2022/0174630 A1* | 6/2022 | Wei | H04W 56/0015 |

FOREIGN PATENT DOCUMENTS

| | | |
|---|---|---|
| CN | 111010730 A | 4/2020 |
| CN | 110312284 B | 7/2020 |
| CN | 112400292 A | 2/2021 |
| DE | 2542998 A1 | 4/1977 |
| IN | 201917000370 A | 11/2019 |
| WO | 2018/227856 A1 | 12/2018 |
| WO | 2018/228196 A1 | 12/2018 |
| WO | 2019063020 A1 | 4/2019 |
| WO | 2019/095941 A1 | 5/2019 |
| WO | 2019136727 A1 | 7/2019 |
| WO | 2020192674 A1 | 1/2020 |
| WO | 2020029772 A1 | 2/2020 |
| WO | 2020063164 A1 | 4/2020 |
| WO | 2020/147603 A1 | 7/2020 |
| WO | 2021033328 A1 | 2/2021 |
| WO | 2021062716 A1 | 4/2021 |

OTHER PUBLICATIONS

Feb. 27, 2023 European Search Report for European Patent Application No. EP 22 19 9323.

* cited by examiner

AD HOC RADIO BASE STATION, METHOD AND COMPUTER PROGRAM

FIELD

Various embodiments relate to an ad hoc radio base station, a method for implementing an ad hoc cell, and a computer-readable medium comprising computer program code, which, when executed by one or more processors, causes performance of the method for implementing the ad hoc cell.

BACKGROUND

An ad hoc radio base station implements an ad hoc (created for a particular purpose as necessary) cell to operate in parallel with existing (usually permanent) cells. The ad hoc radio base station may be used in a surveillance operation, or in an emergency situation, for example. As pre-planning of the ad hoc cell may not be possible, and co-operation with existing cellular radio network infrastructure may be minimal, operation of the ad hoc radio base station needs to be sophisticated to enable flexible and easy operation.

BRIEF DESCRIPTION

According to an aspect, there is provided an ad hoc radio base station, comprising: one or more radio transceivers configured to receive and transmit in a stand-alone, SA, mode of a fifth generation new radio, 5G NR, cellular radio network; and one or more processors configured to cause performance of at least the following: obtaining information regarding existing 5G NR SA cells; for each existing 5G NR SA cell, performing an analysis comprising detecting a frequency of a synchronization signal block, SSB, of the existing 5G NR SA cell from the information, decoding a radio frequency, RF, bandwidth of the existing 5G NR SA cell from the information, and measuring a reference signal received power, RSRP, from the SSB of the existing 5G NR SA cell; and setting up an ad hoc 5G NR SA cell based on the analysis as follows: if the RSRPs of the existing 5G NR SA cells do not exceed a power threshold value, selecting a first frequency for a SSB of the ad hoc 5G NR SA cell so that it does not overlap with the frequencies of the SSBs of the existing 5G NR SA cells while taking into account also an RF bandwidth of the ad hoc 5G NR SA cell and the RF bandwidths of the existing 5G NR SA cells, or else selecting a second frequency for the SSB of the ad hoc 5G NR SA cell so that it overlaps with the frequencies of the SSBs of the existing 5G NR SA cells while taking into account also the RF bandwidth of the ad hoc 5G NR SA cell and the RF bandwidths of the existing 5G NR SA cells.

According to an aspect, there is provided a method for implementing an ad hoc cell, comprising: obtaining information regarding existing 5G NR SA cells; for each existing 5G NR SA cell, performing an analysis comprising detecting a frequency of a synchronization signal block, SSB, of the existing 5G NR SA cell from the information, decoding a radio frequency, RF, bandwidth of the existing 5G NR SA cell from the information, and measuring a reference signal received power, RSRP, from the SSB of the existing 5G NR SA cell; and setting up an ad hoc 5G NR SA cell based on the analysis as follows: if the RSRPs of the existing 5G NR SA cells do not exceed a power threshold value, selecting a first frequency for a SSB of the ad hoc 5G NR SA cell so that it does not overlap with the frequencies of the SSBs of the existing 5G NR SA cells while taking into account also an RF bandwidth of the ad hoc 5G NR SA cell and the RF bandwidths of the existing 5G NR SA cells, or else selecting a second frequency for the SSB of the ad hoc 5G NR SA cell so that it overlaps with the frequencies of the SSBs of the existing 5G NR SA cells while taking into account also the RF bandwidth of the ad hoc 5G NR SA cell and the RF bandwidths of the existing 5G NR SA cells.

According to an aspect, there is provided a computer-readable medium comprising computer program code, which, when executed by one or more microprocessors, causes performance of a method for implementing an ad hoc cell, comprising: obtaining information regarding existing 5G NR SA cells; for each existing 5G NR SA cell, performing an analysis comprising detecting a frequency of a synchronization signal block, SSB, of the existing 5G NR SA cell from the information, decoding a radio frequency, RF, bandwidth of the existing 5G NR SA cell from the information, and measuring a reference signal received power, RSRP, from the SSB of the existing 5G NR SA cell; and setting up an ad hoc 5G NR SA cell based on the analysis as follows: if the RSRPs of the existing 5G NR SA cells do not exceed a power threshold value, selecting a first frequency for a SSB of the ad hoc 5G NR SA cell so that it does not overlap with the frequencies of the SSBs of the existing 5G NR SA cells while taking into account also an RF bandwidth of the ad hoc 5G NR SA cell and the RF bandwidths of the existing 5G NR SA cells, or else selecting a second frequency for the SSB of the ad hoc 5G NR SA cell so that it overlaps with the frequencies of the SSBs of the existing 5G NR SA cells while taking into account also the RF bandwidth of the ad hoc 5G NR SA cell and the RF bandwidths of the existing 5G NR SA cells.

In an embodiment, selecting the first frequency comprises setting a global synchronization channel number, GSCN, for the SSB of the ad hoc 5G NR SA cell different than the GSCNs of the existing 5G NR SA cells, and selecting the second frequency comprises setting the GSCN for the SSB of the ad hoc 5G NR SA cell the same as the GSCNs of the existing 5G NR SA cells.

In an embodiment, the setting up comprises setting a transmission power of the ad hoc 5G NR SA cell such that 5G NR SA terminals in the ad hoc 5G NR SA cell connect to the ad hoc 5G NR SA cell.

In an embodiment, the one or more processors are configured to cause performance of at least the following: transmitting the SSB of the ad hoc 5G NR SA cell on the first frequency; and receiving a connect message from a 5G NR SA terminal in the ad hoc 5G NR SA cell as the SSB of the ad hoc 5G NR SA cell is not disturbed by the SSBs of the existing 5G NR SA cells.

In an embodiment, performing the analysis comprises decoding a timing for the SSB of the existing 5G NR SA cell from the information, and setting up comprises setting a set timing of the SSB of the ad hoc 5G NR SA cell so that it overlaps with timings of the SSBs of the existing 5G NR SA cells.

In an embodiment, setting the set timing comprises setting multiple SSBs with different timings for the ad hoc 5G NR SA cell.

In an embodiment, setting the set timing comprises setting one additional SSB for the ad hoc 5G NR SA cell so that its timing is non-overlapping with the timings of the SSBs of the existing 5G NR SA cells.

In an embodiment, the one or more processors are configured to cause performance of at least the following: transmitting the SSB of the ad hoc 5G NR SA cell on the second frequency using the set timing; and receiving a connect message from a 5G NR SA terminal in the ad hoc 5G NR SA cell as the SSB of the ad hoc 5G NR SA cell is disturbing the SSBs of the existing 5G NR SA cells.

In an embodiment, performing the analysis comprises measuring a reference signal received quality, RSRQ, from the SSB of the existing 5G NR SA cell, and setting up comprises, if the RSRPs of the existing 5G NR SA cells exceed the power threshold value, and if the RSRQs of the existing 5G NR SA cells do not exceed a quality threshold value, selecting the first frequency for the SSB of the ad hoc 5G NR SA cell, or else selecting the second frequency for the SSB of the ad hoc 5G NR SA cell.

In an embodiment, setting up comprises, if the existing 5G NR SA cells use time division duplex, TDD, selecting the first frequency for the SSB of the ad hoc 5G NR SA cell.

In an embodiment, setting up comprises, if the existing 5G NR SA cells use TDD, using an over the air/radio interface-based synchronization, OTA/RIBS, of the ad hoc 5G NR SA cell to the existing 5G NR SA cells.

In an embodiment, the one or more processors comprise: one or more memories including computer program code; and one or more microprocessors configured to execute the computer program code to cause performance of the ad hoc radio base station.

In an embodiment, performing the analysis comprises decoding a timing for the SSB of the existing 5G NR SA cell from the information, and setting the set timing comprises setting a single SSB for the ad hoc 5G NR SA cell so that it is non-overlapping with the timings of the SSBs of the existing 5G NR SA cells.

One or more examples of implementations are set forth in more detail in the accompanying drawings and the description of embodiments.

LIST OF DRAWINGS

Figure 2:
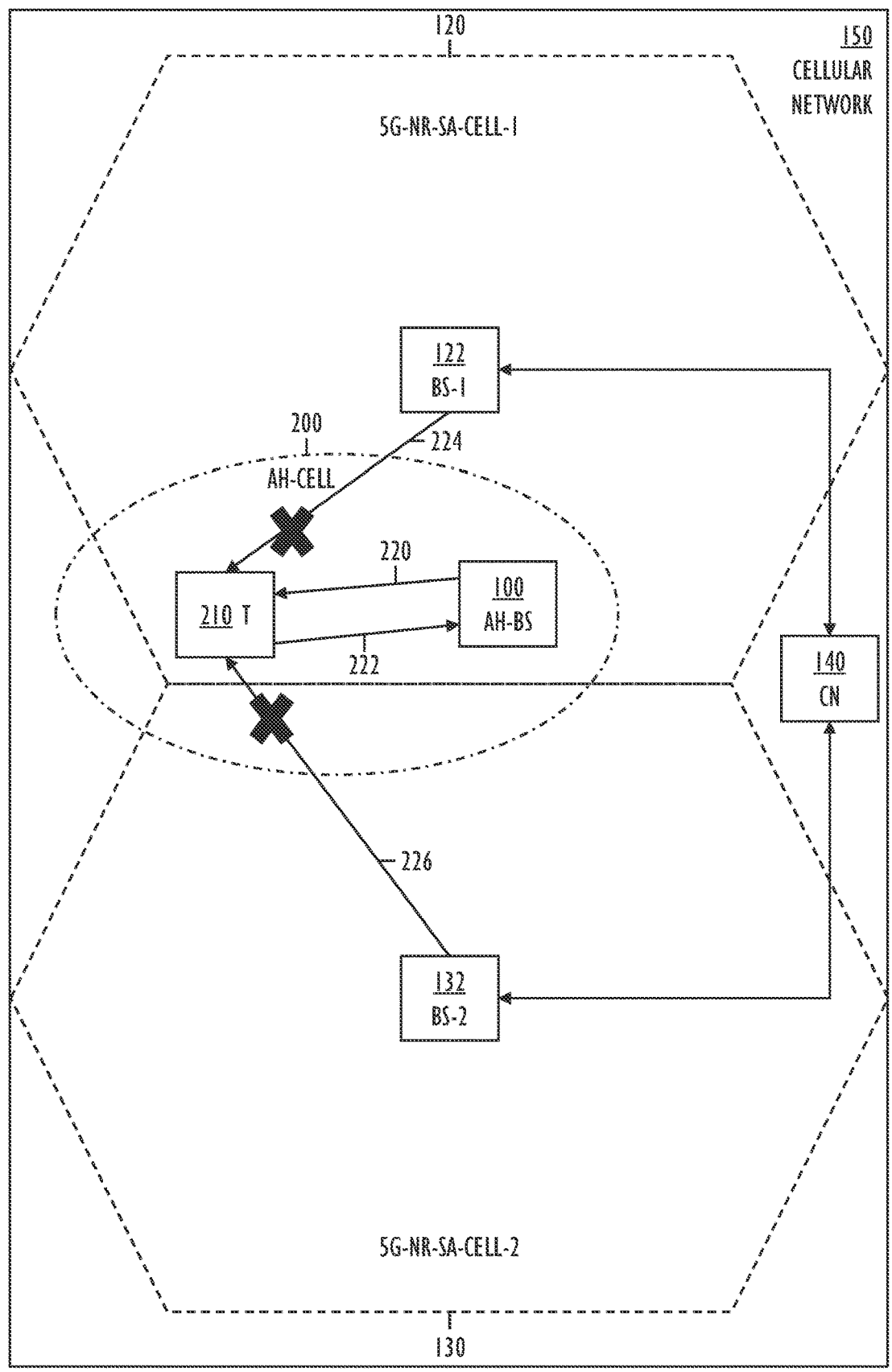
Figure 9A:
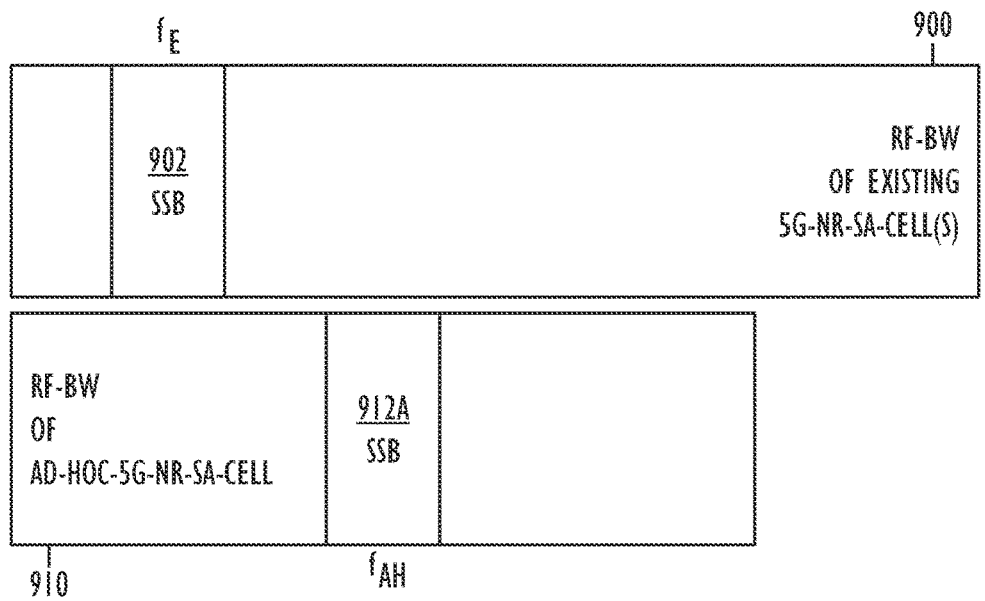
Figure 9B:
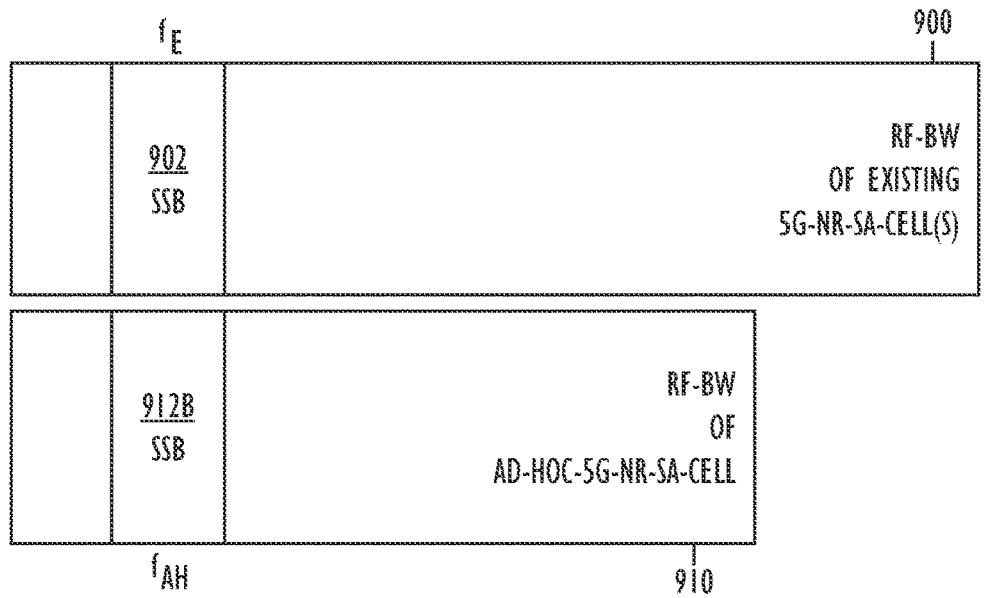
Figure 10:
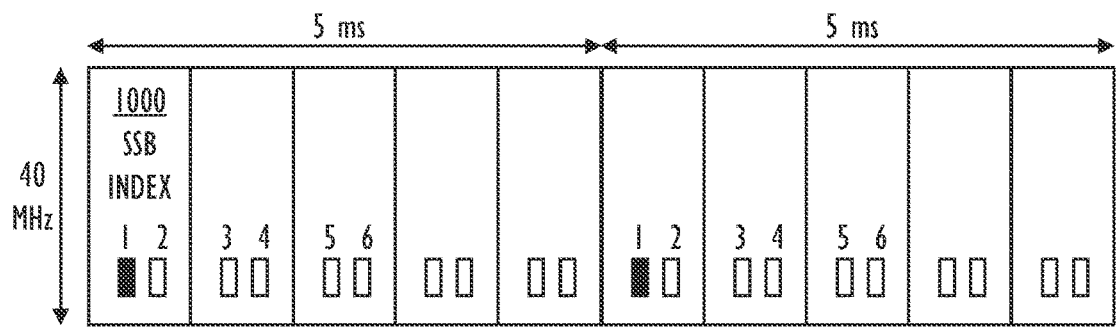

Some embodiments will now be described with reference to the accompanying drawings, in which FIG. 1 and FIG. 2 illustrate embodiments of an ad hoc radio base station, its operating environment, and its operation;

FIG. 3, FIG. 4, FIG. 5, FIG. 6, FIG. 7, and FIG. 8 are flow charts illustrating embodiments of a method for implementing an ad hoc cell;

FIG. 9A, FIG. 9B, and FIG. 10 illustrate embodiments of a synchronization signal block of the ad hoc cell.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 3:
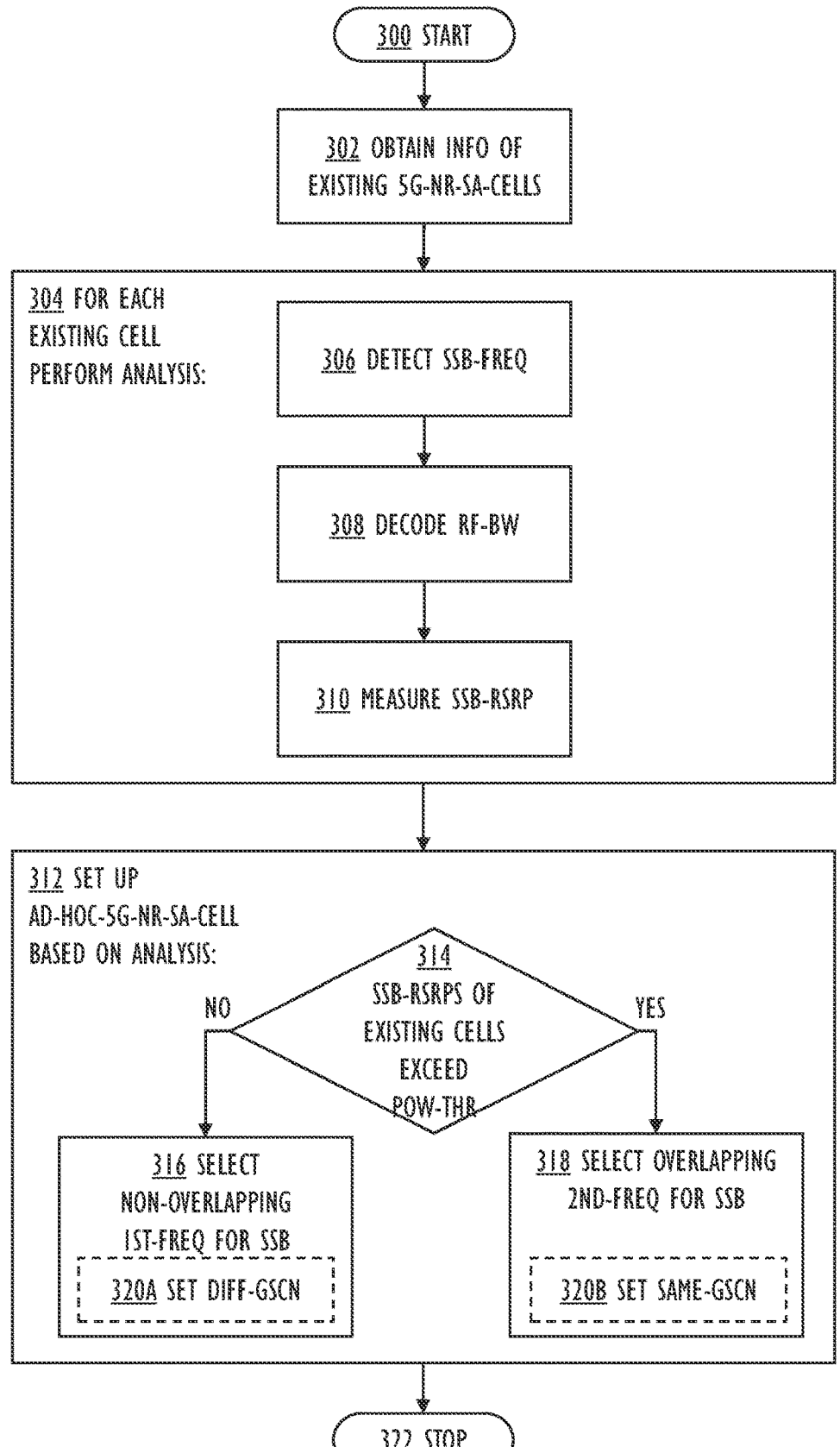
Figure 4:
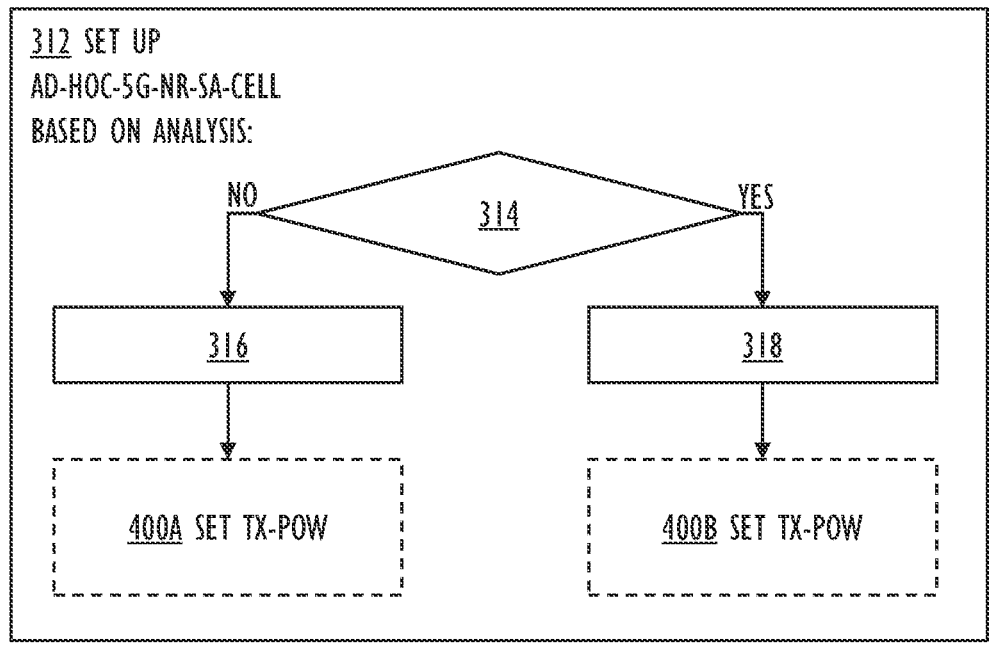
Figure 5:
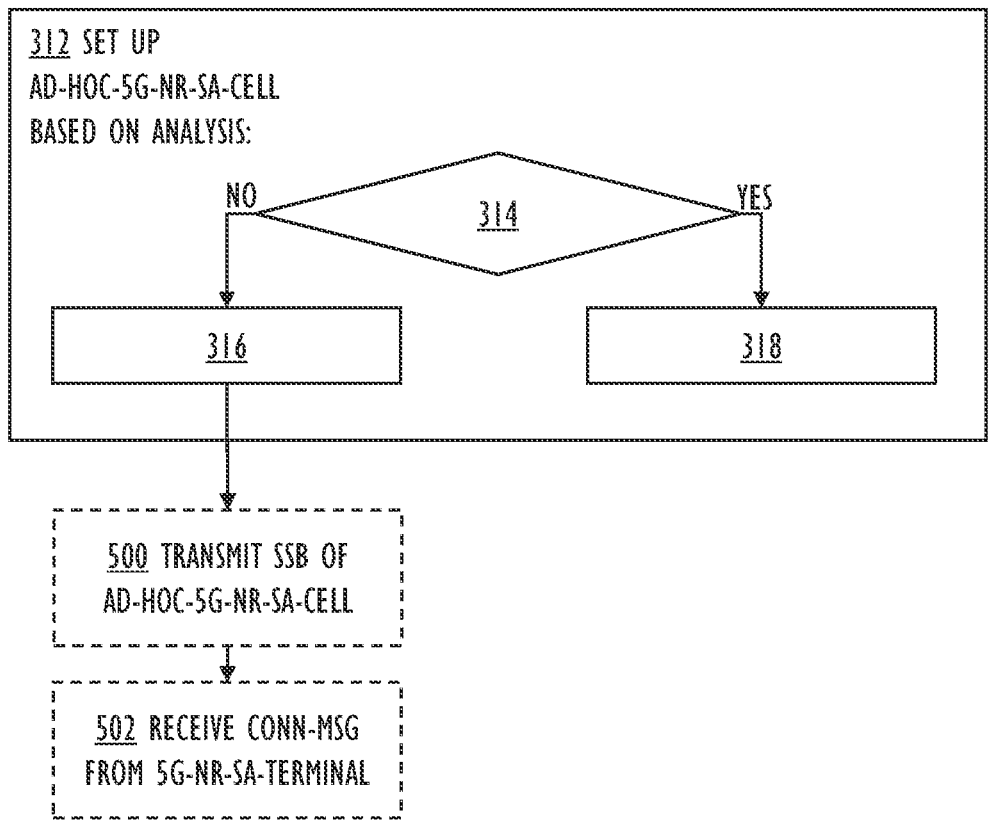
Figure 6:
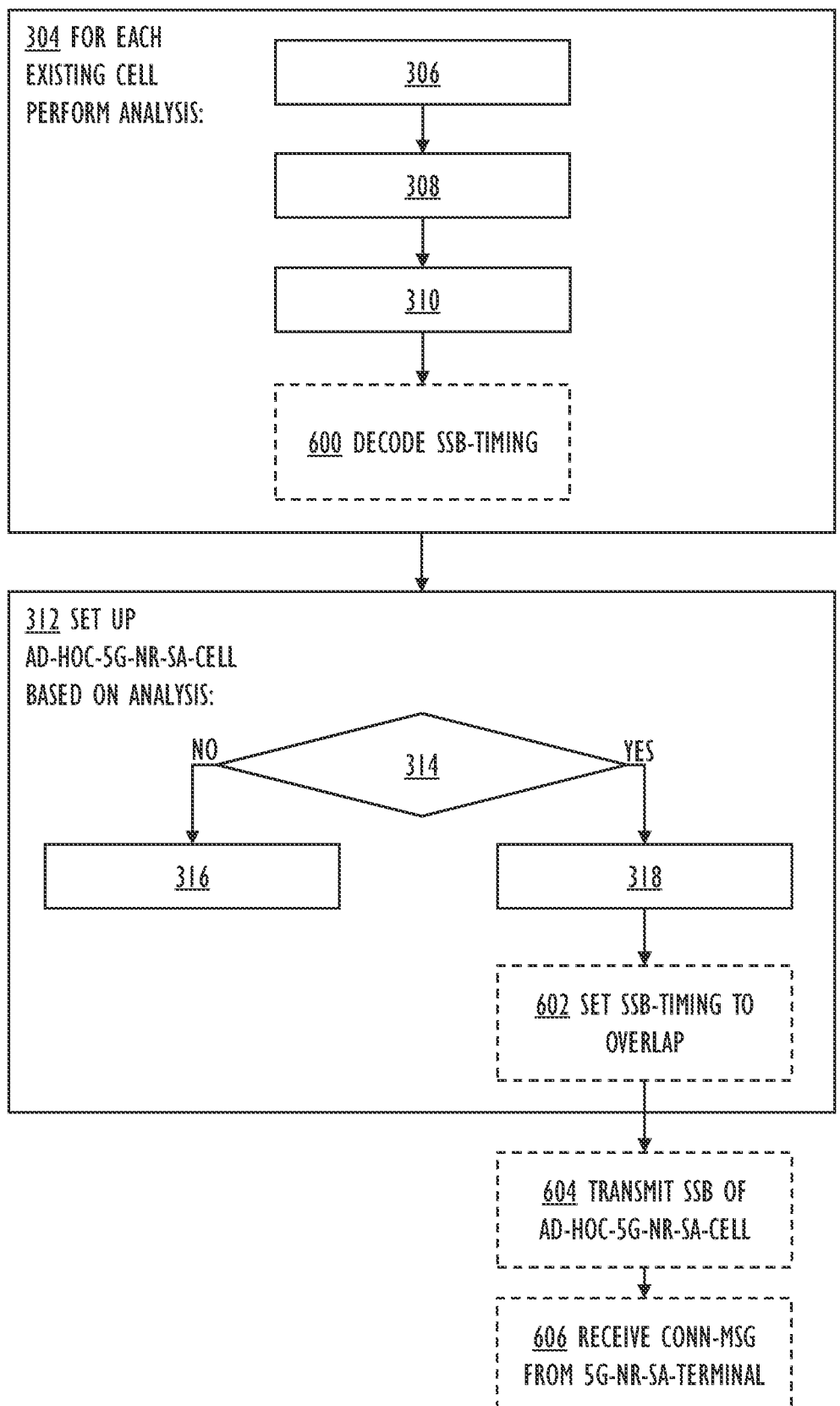
Figure 7:
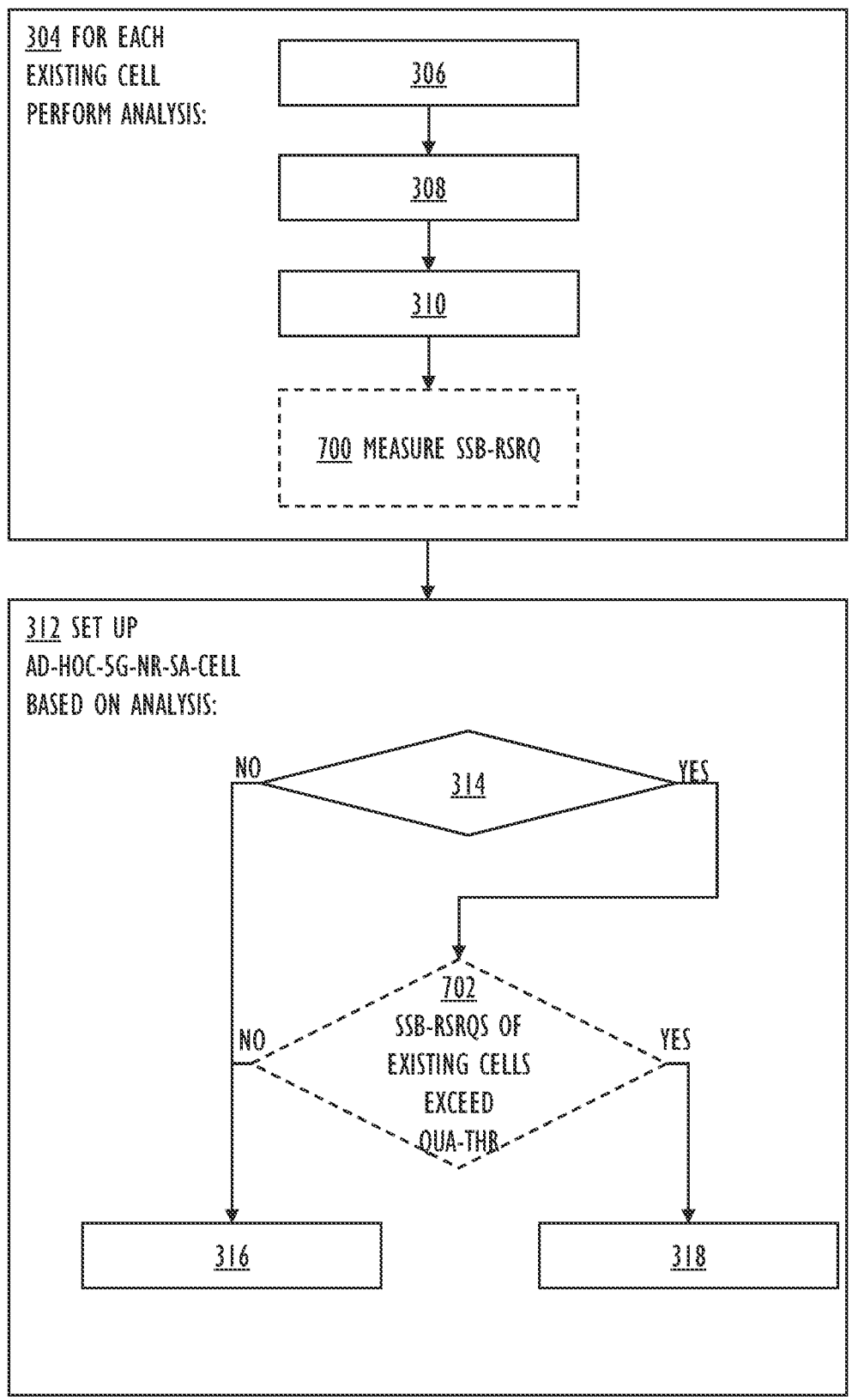
Figure 8:
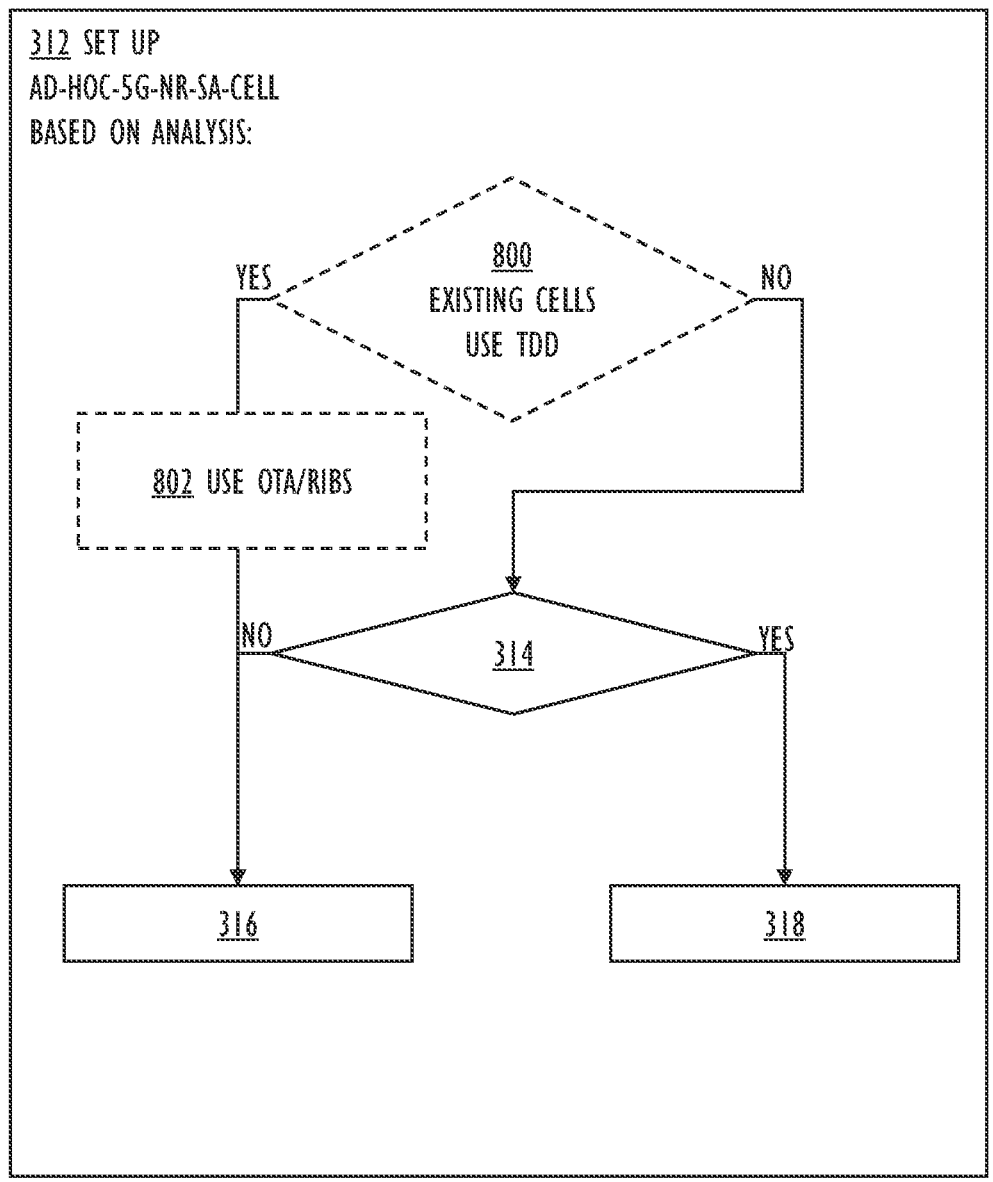

Let us study FIG. 1 and FIG. 2, which illustrate embodiments of an ad hoc radio base station 100, and FIG. 3, which illustrates embodiments of a method for implementing an ad hoc cell 200.

An existing cellular radio network 150 is already in place and operating. The cellular radio network 150 comprises one or more radio base stations 122, 132. Each radio base station 122, 132 provides an access for terminals (or user apparatuses) 210 residing in a cell 120, 130 maintained by the radio base station 122, 132 to utilize communication resources of the cellular radio network 150. The cellular radio network 150 also comprises a core network 140 with numerous network elements. The radio base station (BS) 122, 132 may also be known as a base transceiver station (BTS), an access point (AP), or a gNodeB (or gNB), for example. In the 5G NR, the radio base station 122, 132 may comprise a radio unit (RU), a distributed unit (DU), and a centralized unit (CU), and the core network may comprise an access & mobility management function (AMF), a session management function (SMF), and a user plane function (UPF), and many other functions.

The radio base station 122, 132 operates according to a stand alone (SA) mode of a fifth generation (5G) new radio (NR)-technology.

The SA mode refers to a technology, wherein 5G NR cells are used for both control plane and user plane transfer, whereas a non stand alone (NSA) mode refers to a technology, wherein the control plane of an existing fourth generation (4G) Long-Term Evolution (LTE) network is used for control functions, and 5G NR cells are used for exclusively for the user plane. The cellular radio network 150 operating in the SA mode comprises a new 5G packet core architecture (instead of an evolved packet core architecture of the 4G LTE).

The terminal 210 may also be known as a user equipment (UE), a radio terminal, a subscriber terminal, a smartphone, a mobile station, a mobile phone, a portable computer, a tablet computer, a smartwatch, smartglasses, a game terminal, a machine-type communication (MTC) apparatus, an IoT (Internet of Things) apparatus, a sensor apparatus, or some other type of wireless mobile communication device operating with or without a subscriber identification module (SIM) or an eSIM (embedded SIM). The terminal 210 may be a device that is configured to associate the terminal 210 and its user with a subscription and allows the user to interact with the cellular radio network 150, i.e., the terminal 210 is capable of requesting service from the cellular radio network 150. The terminal 210 may present information to the user and allow the user to input information. In other words, the terminal 210 may be any user apparatus capable of wirelessly receiving information from and/or wirelessly transmitting information to the cellular radio network 150. Besides communication capabilities, the terminal 210 may include computer functionalities, functionalities of other data processing devices, and/or one or more sensors.

The ad hoc radio base station 100 implements the ad hoc cell 200 to operate in parallel with the existing cells 120, 130. The ad hoc radio base station 100 may be used in a surveillance operation to gather information regarding the terminal 210, or in an emergency situation to establish a radio connection with the terminal 210 for communication and/or positioning, for example.

The ad hoc radio base station 100 comprises one or more radio transceivers 102 configured to receive and transmit in the SA mode of the 5G NR cellular radio network 150, and one or more processors 104 configured to cause performance of the ad hoc radio base station 100.

In an embodiment illustrated in FIG. 1, the one or more processors 104 comprise one or more memories 108 including computer program code 110, and one or more microprocessors 106 configured to execute the computer program code 110 to cause the performance of the ad hoc radio base station 100.

In an alternative embodiment, the one or more processors 104 comprise a circuitry configured to cause the performance of the ad hoc radio base station 100.

A non-exhaustive list of implementation techniques for the one or more microprocessors 106 and the one or more memories 108, or the circuitry includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 108 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code (or software) 110 may be written by a suitable programming language (such as C, C++, assembler, or machine language, for example), and the resulting executable code may be stored in the one or more memories 108 and run by the one or more microprocessors 106. The computer program code implements the method/algorithm illustrated in FIG. 3, FIG. 4, FIG. 5, FIG. 6, FIG. 7, and FIG. 8. The computer program code 110 may be stored in a source code form, object code form, executable form, or in some intermediate form, but for use in the one or more microprocessors 106 it is in the executable form. There are many ways to structure the computer program code 110: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program code 110 for performing a wide variety of standard operations. In addition, an operating system (such as a general-purpose operating system or a real-time operating system) may provide the computer program code 110 with system services.

An embodiment provides a computer-readable medium 112 storing the computer program code 110, which, when loaded into the one or more microprocessors 106 and executed by the one or more microprocessors 106, causes the performance of the computer-implemented method/algorithm for implementing the ad hoc cell 200. The computer-readable medium 112 may comprise at least the following: any entity or device capable of carrying the computer program code 110 to the one or more microprocessors 106, a record medium, a computer memory, a read-only memory, an electrical carrier signal, a telecommunications signal, and a software distribution medium. In some jurisdictions, depending on the legislation and the patent practice, the computer-readable medium 112 may not be the telecommunications signal. In an embodiment, the computer-readable medium 112 is a computer-readable storage medium. In an embodiment, the computer-readable medium 112 is a non-transitory computer-readable storage medium.

Now that the structure of the ad hoc radio base station 100 and its operating environment have been described, let us study the dynamics of the method/algorithm with reference to FIG. 3 for the main sequence, and FIG. 4, FIG. 5, FIG. 6, FIG. 7, and FIG. 8 illustrating optional embodiments. The method starts in 300 and ends in 322. The operations are not strictly in chronological order and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

FIG. 1 illustrates a first operation phase, wherein the ad hoc (5G NR SA) radio base station 100 is preparing for the actual operation.

In 302, information regarding the existing 5G NR SA cells 120, 130 is obtained. In an embodiment, the ad hoc radio base station 100 either comprises a radio scanner (possibly utilizing the one or more radio transceivers 102) to scan a predetermined radio spectrum to generate the information, or the ad hoc radio base station 100 receives the information from an external radio scanner. The information may at least partly be obtained by receiving 124, 134 system information from the existing 5G NR SA cells 120, 130. The information may include SIB1 (SystemInformationBlockType1). In an embodiment, the ad hoc radio base station 100 retrieves 114 at least a part of the information from an internal or external data source 116, such as from an internal or external database.

In 304, for each existing 5G NR SA cell 120, 130, an analysis comprising several operations is performed. In 306, a frequency of a synchronization signal block (SSB) of each existing 5G NR SA cell 120, 130 is detected from the information (from primary and secondary synchronization signals, for example). In 308, a radio frequency (RF) bandwidth of each existing 5G NR SA cell 120, 130 is decoded from the information (from SIB1, for example). In 310, a reference signal received power (RSRP) is measured from the SSB of each existing 5G NR SA cell 120, 130.

FIG. 2 illustrates a second operation phase, wherein the ad hoc radio base station 100 sets up the ad hoc 5G NR SA cell 200.

In 312, the ad hoc 5G NR SA cell 200 is set up with several operations based on the analysis. A test is evaluated in 314. If the RSRPs of the existing 5G NR SA cells 120, 130 do not exceed a power threshold value (the test in 314 evaluates "NO"), a first frequency for a SSB of the ad hoc 5G NR SA cell 200 is selected in 316 so that it does not overlap with the frequencies of the SSBs of the existing 5G NR SA cells 120, 130 while taking into account also an RF bandwidth of the ad hoc 5G NR SA cell 200 and the RF bandwidths of the existing 5G NR SA cells 120, 130. Else (the test in 314 evaluates "YES"), a second frequency for the SSB of the ad hoc 5G NR SA cell 200 is selected in 318 so that it overlaps with the frequencies of the SSBs of the existing 5G NR SA cells 120, 130 while taking into account also the RF bandwidth of the ad hoc 5G NR SA cell 200 and the RF bandwidths of the existing 5G NR SA cells 120, 130.

The two alternatives for the placement of the SSB of the ad hoc 5G NR SA cell 200 are illustrated in FIG. 9A and FIG. 9B. As shown, the SSB 902 is placed in frequency $f_E$ of the RF bandwidth 900 of the existing 5G NR SA cell 120, 130. In FIG. 9A, the SSB 912A is placed in the first frequency $f_{AH}$ of the RF bandwidth 910 of the ad hoc 5G NR SA cell 200 so that $f_E \neq f_{AH}$. In FIG. 9B, the SSB 912B is placed in the second frequency $f_{AH}$ of the RF bandwidth 910 of the ad hoc 5G NR SA cell 200 so that $f_E = f_{AH}$.

In the LTE, the synchronization channel is always in the middle of the RF range allocated to the operator. 3GPP added the flexible SSB frequency position and flexible SSB timing to the specifications of 5G NR SA base stations. The ad hoc 5G NR SA cell 200 needs to compete with the existing 5G NR SA cells 120, 130 of the operator(s). The described set up in 312 makes the ad hoc 5G NR SA cell 200 more attractive to 5G NR SA terminals 210, increases the range of the ad hoc (5G NR SA) base station 100, and minimizes the interference to the existing (5G NR SA) base stations 122, 132.

In an embodiment, the reason to add the ad hoc radio base station 100 to an area is to get 5G NR SA terminals 210 to communicate through the ad hoc radio base station 100. Another reason may be to take load from the existing base stations 122, 132. In an embodiment, these criteria may be used to select the frequency for the SSB.

If the ad hoc radio base station 100 operates on the same frequency with the strong existing base stations 122, 132 in the area, the ad hoc radio base station 100 selects the frequency for the SSB to be the same as in the strongest existing 5G NR SA cell 120, 130. The ad hoc 5G NR SA cell 200 causes interference to the existing 5G NR SA cell 120, 130. The interference pushes the 5G NR SA terminals 210 away from the existing 5G NR SA cells 120, 130 so that the 5G NR SA terminals 210 try to camp to the ad hoc 5G NR SA cell 200.

If the ad hoc radio base station 100 is put on the frequency with non-existing or only weak base stations 122, 132, the ad hoc radio base station 100 selects the frequency for the SSB that is different from the strongest existing 5G NR SA cell 120, 130 in the area so that the SSB of the ad hoc 5G NR SA cell 200 is not disturbed by the existing 5G NR SA cells 120, 130 and the 5G NR SA terminals 210 detect the ad hoc 5G NR SA cell 200 more attractive than the existing 5G NR SA cells 120, 130.

In an embodiment, the first frequency and the second frequency are defined using a global synchronization channel number (GSCN). Selecting in 316 the first frequency comprises setting in 320A a GSCN for the SSB of the ad hoc 5G NR SA cell 200 different than the GSCNs of the existing 5G NR SA cells 120, 130. Selecting in 318 the second frequency comprises setting in 320B a GSCN for the SSB of the ad hoc 5G NR SA cell 200 the same as the GSCNs of the existing 5G NR SA cells 120, 130. 3GPP specification 38.213 defines a SSB positioning parameter with a length of 4, 8 or 64 bits. The applicant noticed that when two 5G NR SA cells with the same NR-ARFCN-value (New Radio Absolute Radio Frequency Channel Number) but with different GSCN-values (=different SSB frequency positions) were started, a 5G NR SA capable network scanner reported PCIs (Physical Cell ID) of both cells as shown in Table 1.

TABLE 1

| Band | GSCN | S_SCS | PCI | dBm | RSRP | SNR | RSSI | RSRQ | ARFCN | SCS | f |
|---|---|---|---|---|---|---|---|---|---|---|---|
| n 78 | 7818 | 30 | 12 | −93.9 | −107.6 | 17.1 | −93.9 | | | | |
| n 78 | 7874 | 30 | 501 | −93.5 | −113.5 | 12.0 | −93.5 | −2.9 | 636000 | 30 | 3540 |
| n 78 | 7875 | 30 | 500 | −92.0 | −101.1 | 25.7 | −92.0 | | | | |

But if the GSCN-values were set the same, the scanner detected a PCI of one cell only. The stronger cell caused so much interference to the other cell that the scanner could not synchronize to the cell and detect its PCI. This is a clear indication of the utility of the described embodiments in practice.

In an embodiment, the setting up in 312 comprises setting in 400A, 400B a transmission power of the ad hoc 5G NR SA cell 200 such that 5G NR SA terminals 210 in the ad hoc 5G NR SA cell 200 connect to the ad hoc 5G NR SA cell 200. If the first frequency is used for the SSB of the ad hoc 5G NR SA cell 200, then $f_E \neq f_{AH}$, whereby the transmission power is kept at such a low level so that the 5G NR SA terminal 210 receives it at the same power level as the existing 5G NR SA cells 120, 130, because the idea is to minimize the interference caused to the existing 5G NR SA cells 120, 130. If the second frequency is used for the SSB of the ad hoc 5G NR SA cell 200, then $f_E = f_{AH}$, whereby the transmission power is kept at such a high power level so that the 5G NR SA terminal 210 receives it at the higher power level than the existing 5G NR SA cells 120, 130, because the idea is to dominate the existing 5G NR SA cells 120, 130.

FIG. 2 also illustrates a third operation phase, wherein the ad hoc 5G NR SA cell 200 starts to serve the 5G NR SA terminals 210. The service may be full service with data and/or speech transmission, and/or the service may be a partial service such as the ad hoc radio base station 100 receiving a SUCI (Subscription Concealed Identifier) or a 5G-GUTI (5G Globally Unique Temporary Identifier) from the 5G NR SA terminal 210.

As shown in FIG. 2, a 5G NR SA terminal 210 may receive transmissions 224, 226 from the existing 5G NR SA base stations 122, 132, but a transmission 220 from the ad hoc 5G NR SA base station 100 is received with a higher power and/or a better quality at the 5G NR SA terminal 210, which causes that the 5G NR SA terminal 210 connects 222 to the ad hoc 5G NR SA base station 100.

In an embodiment, the SSB of the ad hoc 5G NR SA cell 200 is transmitted in 500 on the first frequency, and a connect message is received in 502 from a 5G NR SA terminal 210 in the ad hoc 5G NR SA cell 200 as the SSB of the ad hoc 5G NR SA cell 200 is not disturbed by the SSBs of the existing 5G NR SA cells 120, 130.

In an embodiment, performing the analysis in 304 comprises decoding in 600 a timing for the SSB of the existing 5G NR SA cell 120, 130 from the information, and setting up in 312 comprises setting in 602 a set timing of the SSB of the ad hoc 5G NR SA cell 200 so that it overlaps with timings of the SSBs of the existing 5G NR SA cells 120, 130.

FIG. 10 illustrates an embodiment of the timing of the SSB. A 40 MHz bandwidth is used for transmission of 5 ms frames. Each frame may transmit the SSB in various positions addressed by an SSB index 1000. For example, the SSB of the ad hoc 5G NR SA cell 200 is transmitted with an SSB index 1 as shown in FIG. 10. As described in the previous paragraph, the timings of the SSBs of the existing 5G NR SA cells 120, 130 are then also transmitted with the SSB index 1 to overlap.

In an embodiment, setting the set timing in 602 comprises setting multiple SSBs with different timings for the ad hoc 5G NR SA cell 200. For example, if the existing 5G NR SA cells 120, 130 transmit with SSB indexes 1, 2, and 3, then the ad hoc 5G NR SA cell 200 transmits multiple SSBs with the overlapping SSB indexes 1, 2, and 3. In an additional embodiment, setting the set timing in 602 comprises setting one additional SSB for the ad hoc 5G NR SA cell 200 so that its timing is non-overlapping with the timings of the SSBs of the existing 5G NR SA cells 120, 130. Developing the previous example further, the non-overlapping SSB of the ad hoc 5G NR SA cell 200 may be transmitted with any one of the SSB indexes 4, 5, and 6. In addition, the example can developed further, where the ad hoc 5G SA cell 200 may transmit a single non-overlapping SSB index 2.

In an embodiment, the SSB of the ad hoc 5G NR SA cell 200 is transmitted in 604 on the second frequency using the set timing, and a connect message is received in 606 from a 5G NR SA terminal 210 in the ad hoc 5G NR SA cell 200 as the SSB of the ad hoc 5G NR SA cell 200 is disturbing the SSBs of the existing 5G NR SA cells 120, 130.

In an embodiment, besides using SSB-RSRP, a quality measure of the SSB may also be used. Performing the analysis in 304 comprises measuring in 700 a reference signal received quality (RSRQ) from the SSB of the existing 5G NR SA cell 120, 130. Setting up in 312 comprises, if the RSRPs of the existing 5G NR SA cells 120, 130 exceed the power threshold value (the test in 314 evaluates "YES"), and if the RSRQs of the existing 5G NR SA cells 120, 130 do not exceed a quality threshold value (a test in 702 evaluates "NO"), selecting in 316 the first frequency for the SSB of the ad hoc 5G NR SA cell 200, or else (the test in 702 evaluates "YES") selecting in 318 the second frequency for the SSB of the ad hoc 5G NR SA cell 200.

In an embodiment, setting up in 312 comprises, if the existing 5G NR SA cells 120, 130 use time division duplex, TDD, (a test in 800 evaluates "YES"), selecting in 316 the first frequency for the SSB of the ad hoc 5G NR SA cell 200. In an additional embodiment, setting up in 312 comprises, if the existing 5G NR SA cells use TDD (the test in 800 evaluates "YES"), using in 802 an over the air/radio interface-based synchronization, OTA/RIBS, of the ad hoc 5G NR SA cell 200 to the existing 5G NR SA cells 120, 130.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An ad hoc radio base station, which includes:
   one or more radio transceivers configured to receive and transmit in a stand-alone (SA) mode of a fifth-generation new radio (5G NR) cellular radio network; and
   one or more processors configured to cause performance of at least the following:
   obtaining information regarding existing 5G NR SA cells;
   for each existing 5G NR SA cell, performing an analysis which includes:
      detecting a frequency of a synchronization signal block (SSB) of the existing 5G NR SA cell from the information,
      decoding a radio frequency (RF) bandwidth of the existing 5G NR SA cell from the information,
      measuring a reference signal received power (RSRP) from the SSB of the existing 5G NR SA cell, and
      measuring a reference signal received quality (RSRQ) from the SSB of the existing 5G NR SA cell; and
   setting up an ad hoc 5G NR SA cell based on the analysis as follows:
      when the RSRPs of the existing 5G NR SA cells do not exceed a power threshold value, selecting a first frequency for a SSB of the ad hoc 5G NR SA cell so that the first frequency does not overlap with frequencies of the SSBs of the existing 5G NR SA cells while taking into account also an RF bandwidth of the ad hoc 5G NR SA cell and the RF bandwidths of the existing 5G NR SA cells,
      or when the RSRPs of the existing 5G NR SA cells exceed the power threshold value, and when the RSRQs of the existing 5G NR SA cells do not exceed a quality threshold value, selecting the first frequency for the SSB of the ad hoc 5G NR SA cell,
      else selecting a second frequency for the SSB of the ad hoc 5G NR SA cell so that the second frequency overlaps with the frequencies of the SSBs of the existing 5G NR SA cells while taking into account also the RF bandwidth of the ad hoc 5G NR SA cell and the RF bandwidths of the existing 5G NR SA cells.

2. The base station of claim 1, wherein the one or more processors are configured to cause performance of at least the following:
   select the first frequency by setting a global synchronization channel number (GSCN) for the SSB of the ad hoc 5G NR SA cell different than GSCNs of the existing 5G NR SA cells; and
   select the second frequency by setting the GSCN for the SSB of the ad hoc 5G NR SA cell to be a same as the GSCNs of the existing 5G NR SA cells.

3. The base station of claim 1, wherein the setting up comprises:
   setting a transmission power of the ad hoc 5G NR SA cell such that 5G NR SA terminals in the ad hoc 5G NR SA cell connect to the ad hoc 5G NR SA cell.

4. The base station of claim 1, wherein the one or more processors are configured to cause performance of at least the following:
   transmitting the SSB of the ad hoc 5G NR SA cell on the first frequency; and
   receiving a connect message from a 5G NR SA terminal in the ad hoc 5G NR SA cell as the SSB of the ad hoc 5G NR SA cell is not disturbed by the SSBs of the existing 5G NR SA cells.

5. The base station of claim 1, wherein performing the analysis comprises:
   decoding a timing for the SSB of the existing 5G NR SA cell from the information; and wherein the setting up comprises:
   setting a set timing of the SSB of the ad hoc 5G NR SA cell so that the set timing overlaps with timings of the SSBs of the existing 5G NR SA cells.

6. The base station of claim 5, wherein setting the set timing comprises:

setting multiple SSBs with different timings for the ad hoc 5G NR SA cell.

7. The base station of claim 6, wherein setting the set timing comprises:
setting one additional SSB for the ad hoc 5G NR SA cell so that timing of the one additional SSB is non-overlapping with the timings of the SSBs of the existing 5G NR SA cells.

8. The base station of claim 5, wherein the one or more processors are configured to cause performance of at least the following:
transmitting the SSB of the ad hoc 5G NR SA cell on the second frequency using the set timing; and
receiving a connect message from a 5G NR SA terminal in the ad hoc 5G NR SA cell as the SSB of the ad hoc 5G NR SA cell is disturbing the SSBs of the existing 5G NR SA cells.

9. The base station of claim 1, wherein setting up comprises:
when the existing 5G NR SA cells use time division duplex (TDD) selecting the first frequency for the SSB of the ad hoc 5G NR SA cell.

10. The base station of claim 9, wherein setting up comprises:
when the existing 5G NR SA cells use TDD, using an over the air/radio interface-based synchronization (OTA/RIBS) of the ad hoc 5G NR SA cell to the existing 5G NR SA cells.

11. The base station of claim 1, wherein the one or more processors comprise:
one or more memories including computer program code; and
one or more microprocessors configured to execute the computer program code to cause performance of the ad hoc radio base station.

12. The base station of claim 1, wherein performing the analysis comprises:
decoding a timing for the SSB of the existing 5G NR SA cell from the information, and wherein the setting the set timing comprises:
setting a single SSB for the ad hoc 5G NR SA cell so that the single SSB is non-overlapping with the timings of the SSBs of the existing 5G NR SA cells.

13. A method for implementing an ad hoc cell, the method comprising:
obtaining information regarding existing fifth-generation new radio (5G NR) stand-alone (SA) cells;
for each existing 5G NR SA cell, performing an analysis including:
detecting a frequency of a synchronization signal block (SSB) of the existing 5G NR SA cell from the information,
decoding a radio frequency (RF) bandwidth of the existing 5G NR SA cell from the information,
measuring a reference signal received power (RSRP) from the SSB of the existing 5G NR SA cell, and
measuring a reference signal received quality (RSRQ) from the SSB of the existing 5G NR SA cell; and
setting up an ad hoc 5G NR SA cell based on the analysis as follows:
when the RSRPs of the existing 5G NR SA cells do not exceed a power threshold value, selecting a first frequency for a SSB of the ad hoc 5G NR SA cell so that the first frequency does not overlap with frequencies of the SSBs of the existing 5G NR SA cells while taking into account also an RF bandwidth of the ad hoc 5G NR SA cell and the RF bandwidths of the existing 5G NR SA cells,
or when the RSRPs of the existing 5G NR SA cells exceed the power threshold value, and when the RSRQs of the existing 5G NR SA cells do not exceed a quality threshold value, selecting the first frequency for the SSB of the ad hoc 5G NR SA cell,
else selecting a second frequency for the SSB of the ad hoc 5G NR SA cell so that the second frequency overlaps with the frequencies of the SSBs of the existing 5G NR SA cells while taking into account also the RF bandwidth of the ad hoc 5G NR SA cell and the RF bandwidths of the existing 5G NR SA cells.

14. A non-transitory computer-readable medium containing computer program code, which, when executed by one or more microprocessors, will cause performance of a method for implementing an ad hoc cell, the method comprising:
obtaining information regarding existing fifth-generation new radio (5G NR) stand-alone (SA) cells;
for each existing 5G NR SA cell, performing an analysis including:
detecting a frequency of a synchronization signal block (SSB) of the existing 5G NR SA cell from the information,
decoding a radio frequency (RF) bandwidth of the existing 5G NR SA cell from the information,
measuring a reference signal received power (RSRP) from the SSB of the existing 5G NR SA cell, and
measuring a reference signal received quality (RSRQ) from the SSB of the existing 5G NR SA cell; and
setting up an ad hoc 5G NR SA cell based on the analysis as follows:
when the RSRPs of the existing 5G NR SA cells do not exceed a power threshold value, selecting a first frequency for a SSB of the ad hoc 5G NR SA cell so that the first frequency does not overlap with frequencies of the SSBs of the existing 5G NR SA cells while taking into account also an RF bandwidth of the ad hoc 5G NR SA cell and the RF bandwidths of the existing 5G NR SA cells,
or when the RSRPs of the existing 5G NR SA cells exceed the power threshold value, and when the RSRQs of the existing 5G NR SA cells do not exceed a quality threshold value, selecting the first frequency for the SSB of the ad hoc 5G NR SA cell,
else selecting a second frequency for the SSB of the ad hoc 5G NR SA cell so that the second frequency overlaps with the frequencies of the SSBs of the existing 5G NR SA cells while taking into account also the RF bandwidth of the ad hoc 5G NR SA cell and the RF bandwidths of the existing 5G NR SA cells.

* * * * *